United States Patent

Pirooz

[11] 3,903,353
[45] Sept. 2, 1975

[54] GLASS CONDUIT FOR ELECTRICAL CONDUCTOR

[75] Inventor: Perry P. Pirooz, Toledo, Ohio
[73] Assignee: Owens-Illinois, Inc., Toledo, Ohio
[22] Filed: Nov. 14, 1973
[21] Appl. No.: 415,739

[52] U.S. Cl. .................. 174/68 C; 106/52; 106/54
[51] Int. Cl. .............................................. C03c 3/08
[58] Field of Search ............ 106/54, 52; 174/37, 38, 174/68 R, 68 C, 96, 98

[56] References Cited
UNITED STATES PATENTS

| | | | |
|---|---|---|---|
| 2,092,647 | 2/1946 | Hobert | 174/71 |
| 2,556,616 | 6/1951 | Ellis | 106/54 X |
| 3,022,183 | 2/1962 | Duncan | 106/54 |
| 3,095,311 | 6/1963 | Wranau | 106/54 X |
| 3,310,413 | 3/1967 | Harrington | 106/54 |
| 3,535,133 | 10/1970 | Akhtar | 106/54 X |
| 3,598,620 | 8/1971 | Akhtar | 106/54 |

FOREIGN PATENTS OR APPLICATIONS
506,209   10/1942   United Kingdom.................. 174/71

Primary Examiner—Winston A. Douglas
Assistant Examiner—John F. Niebling
Attorney, Agent, or Firm—Howard G. Bruss, Jr.; E. J. Holler

[57] ABSTRACT

Disclosed is a tubular glass conduit for containing and electrically insulating electrical conductors in an underground power transmission network in both alternating and direct current situations. The glass conduit consists essentially of certain alkaline earth alumino borosilicate compositions. These compositions are readily formed by conventional glass working processes, have excellent thermal and electrical stability, low dielectric loss factors even at temperatures in the neighborhood of 150°C, and good chemical durability for prolonged service life.

3 Claims, 4 Drawing Figures

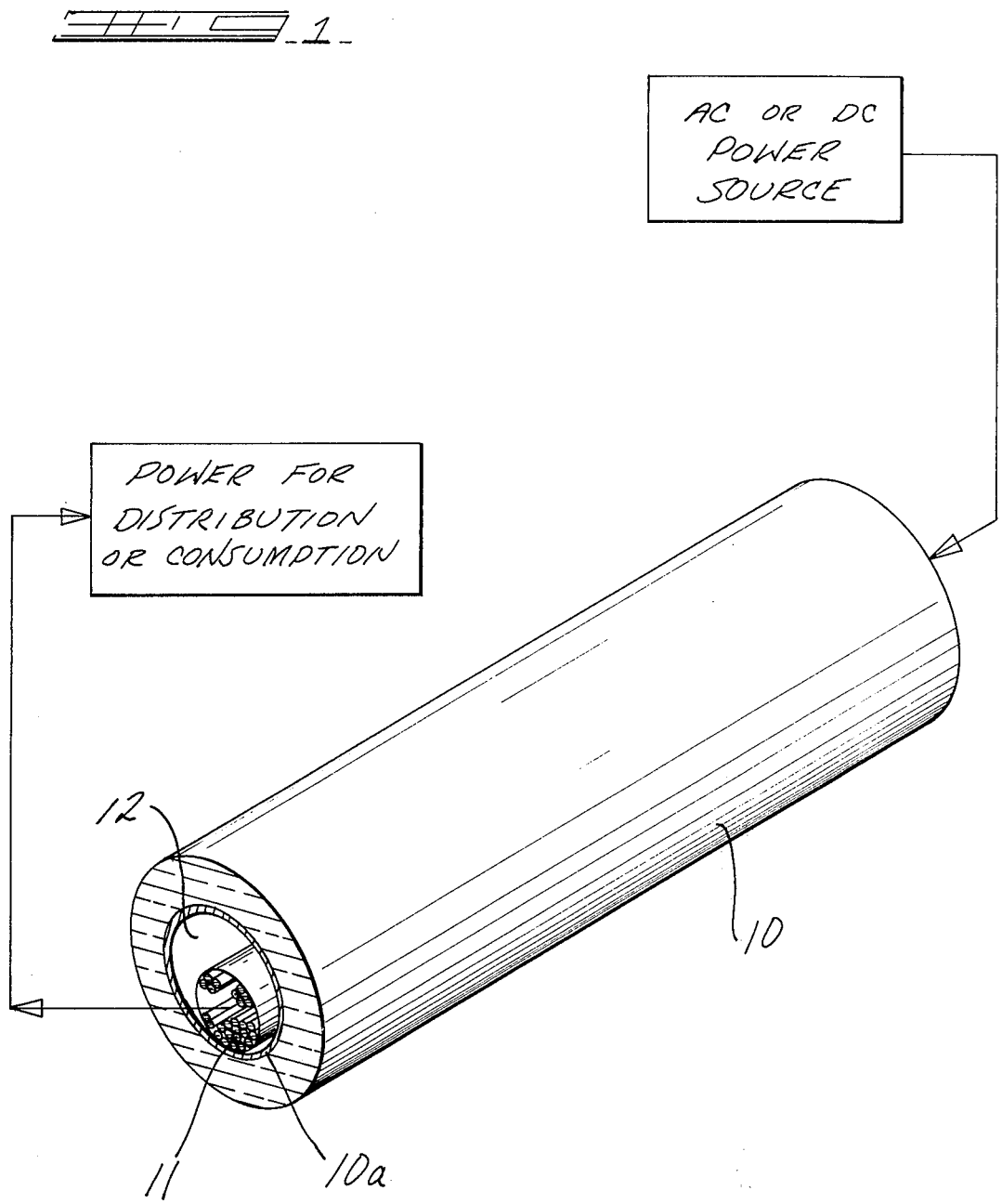

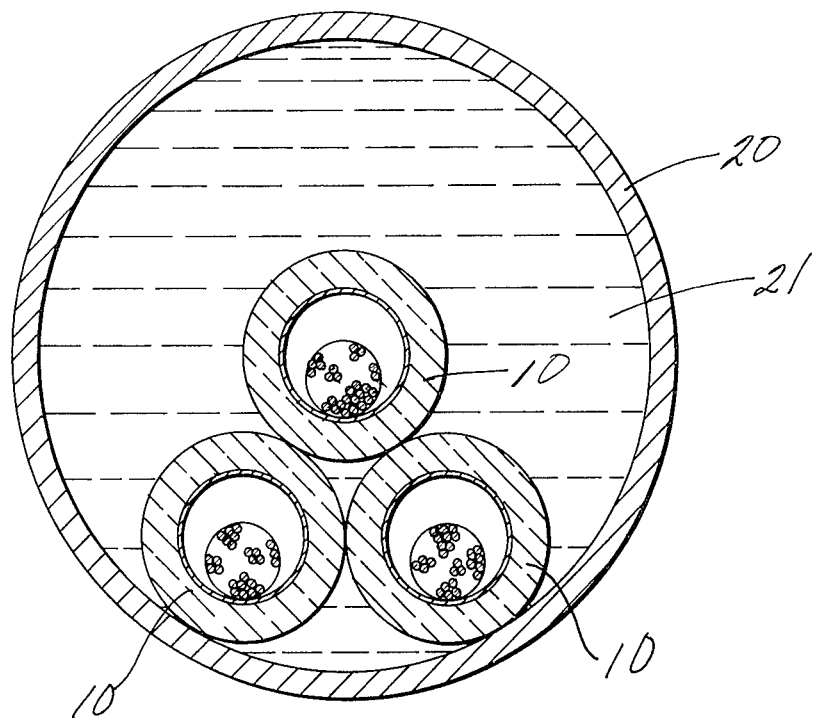
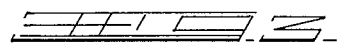
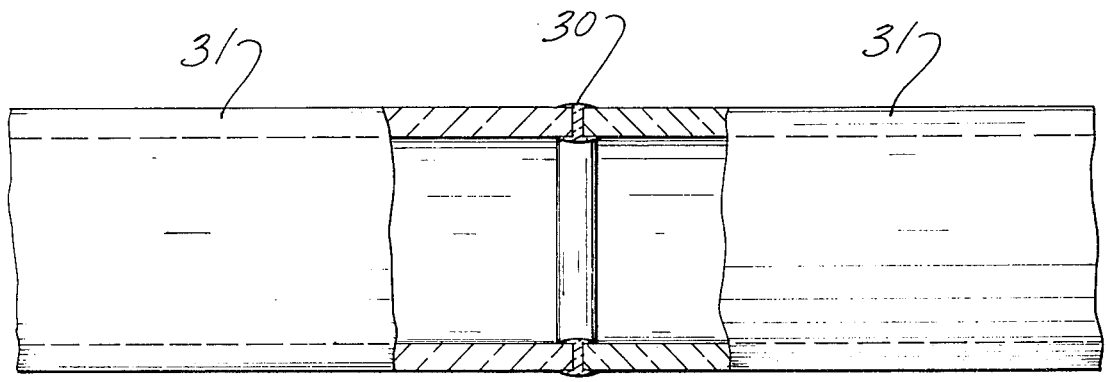

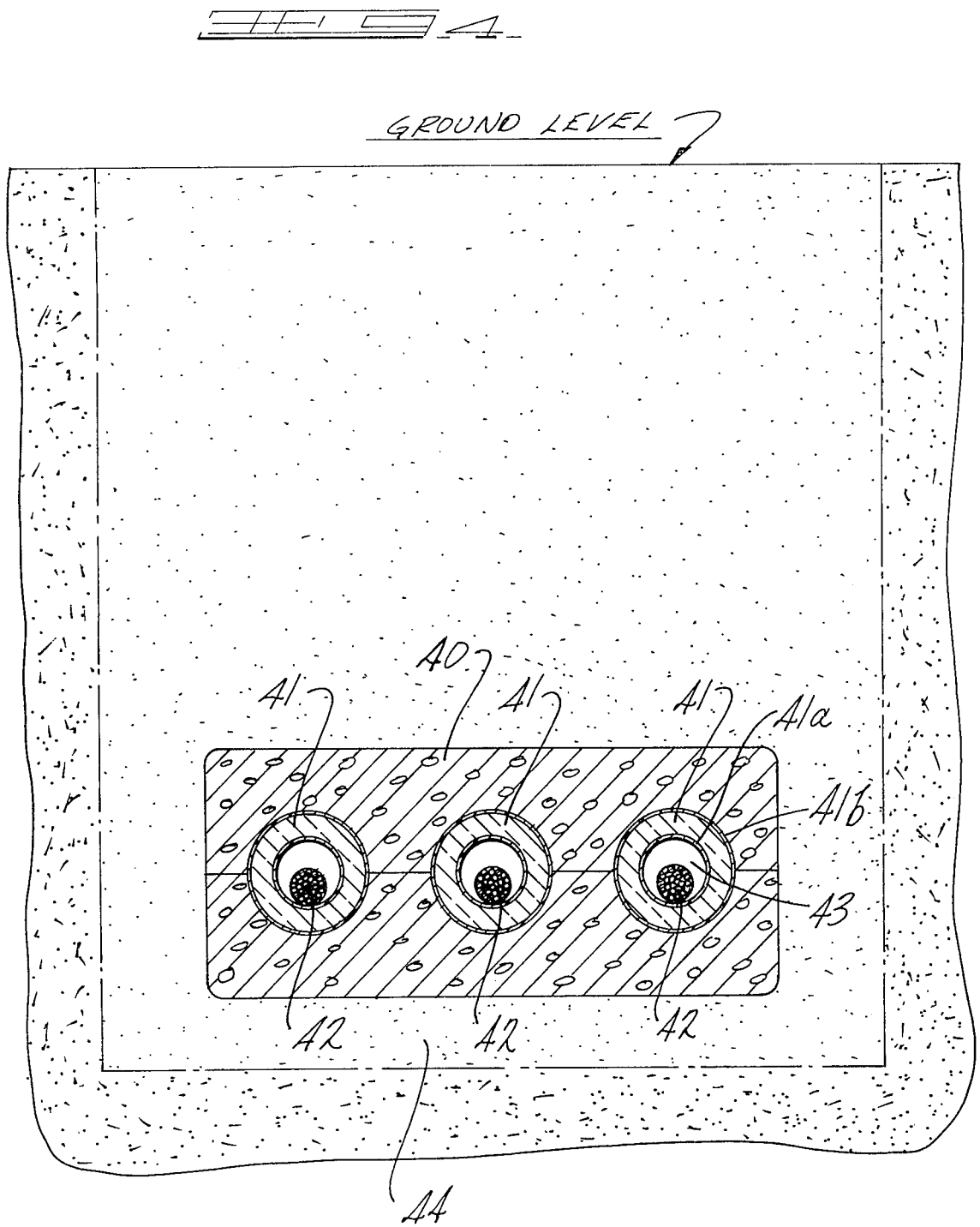

GLASS CONDUIT FOR ELECTRICAL CONDUCTOR

This invention relates to a conduit for electrical conductors. More particularly, this invention pertains to a glass conduit for containing electrical conductors in an underground electrical power transmission network.

This application is related to commonly assigned copending applications Ser. No. 415,738 filed Nov. 14, 1973 entitled "Vitreous Seals for Glass Electrical Conductors", Ser. No. 415,737 filed Nov. 14, 1973 entitled "Semiconducting Coating for Glass Conduits", and Ser. No. 415,919 filed Nov. 14, 1973 entitled "An Electric Power Transmission Line" the disclosures of which are incorporated by reference.

The demand for electrical power has been constantly increasing in recent years and the need for efficient and environmentally acceptable power transmission systems is well established. While conventional overhead power transmission networks have met these needs in the past, they are now becoming less desirable, especially in congested urban areas. As an alternative, underground power transmission networks are being developed.

The high cost of an underground installation of electric transmission facilities requires the efficient use of such facilities. A major limitation upon the amount of power a buried electric conductor can transmit results from the heat generated by the flow of electric current which must be dissipated. For electric power transmission conductors buried in surrounding environments having only moderate heat-conducting ability, it is recognized that current should be limited so that the heat in the conductor does not exceed approximately 70°C. Temperatures above this result in heating the environment to such an extent that it loses much of its ability to transfer heat effectively away from the conductor. Once the heat-conducting property of the environment contacting the conductor is reduced, the conductor tends to overheat. Heating of the conductor increases its electrical resistance. In that the power loss in a resistance is proportional to its temperature the power loss in the conductor in the form of heat increases with the temperature of the conductor. Thus, not only is less heat conducted away from the conductor when the environment loses its ability to conduct heat effectively, but the resulting increase in temperature causes increased heat to the accrued in the conductor. Overheating can become severe enough to cause destruction of the conductor, its insulation, or both.

The present invention provides a conduit for the conductor that is thermally stable and has low dielectric loss factors even at temperatures as high as 150°C.

The principal type of underground electrical cable presently employed has a paper wrapping which is oil impregnated. This cable is commonly known as the oil-paper cable.

The manufacturer of oil-paper transmission cable is a difficult and elaborate manufacturing process which requires an intricate paper wrapping and impregnation technique. The present invention provides an economically and environmentally satisfactory alternative in the form of a glass conduit of a special composition for containment and the insulation of electrical conductors.

In the past, various suggestions have been made to use glass as a conduit for electrical conductors of various types. These suggestions have not been practical, and have not met with commercial acceptance. For instance, U.S. Pat. No. 224,551 suggests the use of a grooved glass plate for carrying underground telegraph wires. U.S. Pat. No. 266,677 suggests the construction of glass pipe from longitudinal glass sections of unspecified composition for containing electrical cable in an underground installation. U.S. Pat. No. 2,273,135 suggests containing an electrical cable core in a glass protective sheathing of unspecified composition. It is an important feature of U.S. Pat. No. 2,273,135 that the glass does not constitute any part of the electrical insulation and conventional air-space insulation is employed. These patents do not solve or even appreciate the problems of electrical, thermal, and chemical stability that can arise with the long term use of glass in containing and electrically insulating underground electrical networks of practical power capacity and length.

Accordingly, the present invention solves these and other problems of underground electric power transmission by providing a glass conduit of a special alkaline earth alumino borosilicate composition which is essentially free of alkali metal oxides. The conduit functions to contain electrical conductors as well as serving as the electrical insulation therefor. Furthermore, the glass conduit of invention is useful in the transmission of both AC and DC power; although AC power is presently the more important from a commercial standpoint.

For such AC applications, the dielectric properties of the glass conduit are such that the dielectric transmission losses per unit length are within the range of practical tolerance.

The glass compositions are electrically stable and resist failure due to electrically induced ion migration under prolonged exposure to the extreme electrical fields encountered in actual practice. The glass compositions also have a viscosity-temperature relationship and liquids temperature characteristic which render them suitable for conventional glass working and tube drawing processes. The present glass compositions resist devitrification and are chemically durable for extended service life. They have thermal expansion coefficients in the range of about 3 to about $7 \times 10^{-6}/°C$ (0°–300°C) so individual tubular glass conduit sections can be assembled and sealed in end to end fashion to form a continuous transmission network using conventional sealing glass techniques.

The above and other features and advantage of the present invention will become more apparent from the following description and drawings wherein:

FIG. 1 is a schematic diagram, partly in section, of a system illustrating the present invention wherein a glass conduit containing a stranded conductor is shown;

FIG. 2 illustrates the conduit of FIG. 1 in assembly for transmission of three phase AC power;

FIG. 3 is a broken away, cross sectional illustration of a seal between individual conduit sections like those of FIG. 1;

FIG. 4 is a cross sectional schematic illustration of a three-phase AC power installation in an underground environment.

The specific composition range of the present invention provides a unique and specific combination of chemical, physical, and electrical properties required for effective service as an electrically insulating conduit.

One of the more important properties of the present glass conduit is the dielectric characteristics at elevated temperatures. These characteristics are particularly important in the transmission of alternating current. When alternating current is being carried, dielectric losses arise in the glass conduit. The magnitude of these losses are defined by the product of the dielectric constant (K) and the dissipation factor, which is usually expressed as tan δ. In almost all glass compositions, the product K tan δ increases dramatically with increasing temperature. Unfortunately, elevated temperatures are common in power transmission because of the electric generation of heat as described above. For efficient power transmission, the K tan δ dielectric loss should be no greater than about 0.1 at 150°C and 50Hz. The glass conduit composition of the present invention fulfills this requirement. This is a realistic value for commercial situations.

The glass conduit composition of invention is also resistant to electrically induced ion migration. This is a common cause of failure of glass in contact with metallic conductors at extreme potential gradients. The problem is particularly acute when copper conductors are employed because the copper experiences dendritic growth through the glass which eventually results in electrical failure. The present glass compositions are resistant to such electrical migrations.

Finally it must be possible to form the molten glass into glass tubing by practical processes without devitrification because devitrification detracts from the electrical properties. A requirement for tube formation without devitrification is that the viscosity at the liquidus temperature should be above about log 4. All of these properties are realized in the present glass compositions.

In attaining objectives of this invention, one feature resides in forming a tubular glass conduit of a composition consisting essentially of an alkali metal oxide free composition within the weight range of:

| OXIDE | WEIGHT % |
| --- | --- |
| $SiO_2$ | 28–60 |
| $B_2O_3$ | 5–25 |
| $Al_2O_3$ | 13–35 |
| CaO | 0–30 |
| MgO | 0–30 |
| Wherein: | |
| CaO+MgO | 10–30 |
| $SiO_2+B_2O_3$ | ≤ 75 |
| $SiO_2+Al_2O_3$ | ≤ 75 |
| $Al_2O_3$+CaO+MgO | ≤ 60 |

It is important that the above glass compositions be essentially free of alkali metal oxides because the presence of the alkali metal oxides tend to increase the conductivity, increase the dielectric constant (K), increase the dissipation factor (tan δ), as well as providing mobile monovalent ions for potential electrical migration during use. Small amounts (e.g. less than about 1 or 2 combined weight and preferably less than ½ weight % of alkali oxide) can be tolerated so long as these electrical properties are not detrimentally affected. Thus, the term "alkali metal oxide free" as used herein is intended to include such non-detrimental amounts of such alkali metal oxides.

The above compositions are also specified in terms of additive proportions of the various oxides to assure the presence of the desired forming and electrical properties. For instance, the specified sum of CaO + MgO assures the desirable glass viscosity during melting and low dielectric losses during use. The specified sum of $SiO_2 + B_2O_3$ and $SiO_2 + Al_2O_3$ assures the presence of sufficient glass forming oxides to provide stability against devitrification. The specified sum of $Al_2O_3$ + CaO + MgO assures the balance of low glass viscosity and stability against devitrification to achieve the property specified.

In addition to the six components of the above composition range, the term "consisting essentially" of includes up to 10 wt.% of other oxides such as ZnO, CdO, $ZrO_2$, BaO, PbO and SrO can be used individually or in combination in order to optimize the physical properties so long as such oxides do not cause deviation from the specified properties. Thus, the glass compositions defined above have a dielectric constant (K) of less than about 8 at 50 Hz a liquidus temperature of less than about 1,430°C, a viscosity at the liquidus temperature above about log 4, a dielectric loss factor (K tan δ) at 150°C and 50 Hz of less than 0.1, and a coefficient thermal expansion in the range of 3 to 7 × $10^{-6}$/°C (0°–300°C).

The above glass composition do not easily devitrify and this is important because devitrification tends to raise the K tan δ dramatically. The $Al_2O_3$ content is critical in this regard in that when the $Al_2O_3$ is too low, the glass tends to devitrify and when the $Al_2O_3$ is too high the viscosity at the liquidus temperature is too high. Similarly, when the CaO + MgO content is below about 10 weight %, the glass tends to have a high product of K tan δ.

In a more preferred range within the composition range set forth above, the glass composition consists essentially of:

| OXIDE | WEIGHT % |
| --- | --- |
| $SiO_2$ | 30–60 |
| $B_2O_3$ | 5–24 |
| $Al_2O_3$ | 14–25 |
| CaO | 5–20 |
| MgO | 5–20 |
| Wherein: | |
| CaO+MgO | 11–28 |
| $SiO_2+B_2O_3$ | ≤ 70 |
| $SiO_2+Al_2O_3$ | ≤ 70 |
| $Al_2O_3$+CaO+MgO | ≤ 55 |

These more preferred compositions have a liquidus temperature below about 1,200°C, a dielectric constant (K) at 150°C and 50 Hz of less than about 7.3, and a dielectric loss factor (K tan δ) at 150°C and 50 Hz of less than about 0.05 and coefficient of thermal expansion of ≥ 3.5 × $10^{-6}$ (0°–300°C)/°C.

In an embodiment of the present invention within the composition range set forth above which is most preferred are for practical efficiency and economy, the glass composition consists essentially of:

| OXIDE | WEIGHT % |
| --- | --- |
| $SiO_2$ | 35–60 |
| $B_2O_3$ | 5–23 |
| $Al_2O_3$ | 14–22 |
| CaO | 5–20 |
| MgO | 5–20 |
| Wherein: | |
| CaO+MgO | 15–25 |
| $SiO_2+B_2O_3$ | ≤ 65 |
| $SiO_2+Al_2O_3$ | ≤ 65 |
| $Al_2O_3$+CaO+MgO | ≤ 45 |

These most preferred glass compositions have a liquidus temperature of below 1,100°C, a dielectric constant (K) at 150°C and 50 Hz of less than about 6.8, and a dielectric loss factor (K tan δ) at 150°C and 50 Hz of less than about 0.02 and a coefficient of thermal expansion of $\geq 3.7 \times 10^{-6}$ 0°–300°C/°C.

The tubular glass conduit which is formed from the foregoing compositions can be of any desired geometric cross section such as circular, oval, or polyagonal, although the cylindrical glass conduit (i.e. pipe) is most readily formed by commercial drawing processes and is therefor preferred. Such conduit sections are readily formed by convention tube drawing processes, without substantial devitrification, in convenient lengths (e.g. up to about 10 feet). Such drawing processes are described in Chapter 8 of the "Glass Engineering Handbook," by E. B. Shand, McGraw Hill Book Company (1958), or in U.S. Pat. No. 3,419,376 the disclosures of which are incorporated by reference.

The wall thickness and inside diameter of the glass conduit will, of course, depend upon the nature and capacity of the electrical service intended, with the higher voltages requiring greater wall thicknesses.

The following minimum wall thickness are typical for AC power networks of the following line to ground voltage rating. These wall thicknesses are determined from a consideration of dielectric strength and mechanical strength.

| Line to Ground Voltage (KV) | 40 | 132 | 200 | 400 | 600 |
| --- | --- | --- | --- | --- | --- |
| Typical Maximum Wall Thickness (Inches) | 1 | 1½ | 2 | 3 | 4 |
| Typical Minimum Wall Thickness (Inches) | ⅛ | 3/16 | ¼ | ½ | ½ |
| Typical Nominal Wall Thickness (Inches) | ½ | ¾ | 1 | 1½ | 2 |

The inside diameter of this conduit is usually in the ½ inch to 10 inch range with 2 to 6 inches being typical for the lower voltage rating. These geometric proportions provide adequate mechanical and electrical strength for most electrical transmission systems.

The conductors used to transmit the power inside of the glass conduit can be any conventional metallic conductor such as copper, aluminum, or molten sodium.

While the glass compositions of invention can be used for any type of electrical transmission network, they are of primary significance in the transmission of AC and DC power in excess of 50 megawatt range. Those skilled in the art of electrical transmission will recognize this as the major area of importance in the transmission of electrical power from the point of generation to substations for distribution to the ultimate consumer. The major areas of commercial importance are AC power distribution networks in the 40 KV to 600 KV (line to ground) range.

When such high voltages are being carried, it is often desirable to provide the inside surface of the glass conduit with a semiconductive coating such as tin oxide coating having a surface resistivity in the range of about 10 to about 10,000 ohms per square and usually about 300 to about 1,500 ohms per square. This is more fully disclosed in commonly assinged copending application Ser. No. 415,737, filed Nov. 14, 1973, the disclosure of which is incorporated by reference. These semiconductive coatings provide protection against corona effects from the highly charged conductor as well as inhibiting the tendency for ionic migration from the charged conductor to the glass conduit. Such semiconductive tin oxide coating can be applied by conventional methods such as pyrolyzing tin compounds such as $SnCl_4$ on the glass surface as in U.S. Pat. No. Re. 23,556; U.S. Pat. Nos. 2,564,706; 2,614,944; 2,564,707; and 2,118,795, the disclosures of which are incorporated by reference.

In connecting and assembling the glass conduit of invention, the ends of individual conduit sections can be sealed and fused with a suitable sealing glass composition so as to form a continuous network as disclosed in commonly assigned copending application Ser. No. 415,738 filed Nov. 14, 1973 the disclosure of which is incorporated by reference.

Referring now to FIG. 1, reference numeral 10 represents a cylindrical tubular glass conduit of invention containing and electrically insulating a stranded metallic conductor 11 is shown to be delivering the power for further distribution or consumption.

The inside surface of conduit 10 is provided with a semiconductive coating 10a such as tin oxide and stranded conductor 11 rests directly thereon.

Due to the practical limitations of feeding the conductor 11 into conduit 10, it is impossible for the conductor to completely fill the conduit. Therefore, the residual free volume 12 inside of conduit 10 is filled with a heat transfer fluid such as gaseous $SF_6$, air, or a liquid such as a conventional heat transfer oil.

FIG. 2 shows three of the conduit assemblies of FIG. 1 installed in a single duct 20 for three-phase AC power transmission. The residual free volume 21 is filled with a heat transfer fluid such as water to remove heat from the external surfaces of conduit 10. The heat transfer fluid in free volume 21 can be circulated by means not shown in conjunction with external heat transfer equipment to remove the heat generated during electrical transmission.

FIG. 3 is a cross sectional illustration of the fusion seal 30 joining the ends of two tubular conductors 31. Seal 30 is formed by fusing a sealing glass having compatible fusion point temperature, thermal expansion, and electrical characteristics. Any number of such seals are formed in assembling an underground power transmission network.

FIG. 4 is a schematic illustration of a typical three-phase AC power installation in an underground environment. A precast concrete duct 40 contains and electrically isolates the three glass conduits 41 which conduits contain stranded metallic conductor 42.

The internal surface 41a of conduit 41 is provided with a semiconductive coating such as tin oxide. The outside surface 41b of conduit 41 is provided with a conductive, protective shielding for even distribution of any electrical fields induced the conduit.

The internal volume 43 of glass conduit 41 which is not occupied by stranded conductor 42 is filled with a heat transfer field such as oil or $SF_6$ to remove heat and thereby maintain the temperature of the conductor 42 and conduit 41 as low is practical.

The entire assemble in precast concrete duct 40 is buried a suitable depth below the ground level. This distance is below the frost line and is usually in the neighborhood of 3 to 4 feet. The concrete duct 40 is then backfilled with a thermally conductive material which represented by reference number 44. Such thermally conductive backfill materials are described in U.S. Pat. No. 3,082,111.

The specific advantages of the glass conduit of invention will be illustrated in the examples that follow wherein all parts are parts by weight, all percentages are weight percentages and all temperatures are in °C unless stated otherwise.

EXAMPLE 1

High purity conventional glass making batch materials comprising:

| Part by Weight | Component |
|---|---|
| 2183 | glassmaking sand |
| 823 | alumina |
| 690 | $CaCO_3$ |
| 287 | MgO |
| 1325 | glass frit having the weight percent composition of $SiO_2$-10.2%, CaO-21.4%, MgO-15.4%, $B_2O_3$-53.0% | are melted at 1,430°C for 18 hours in a refractory vessel in a gas fired furnace with continuous mechanical stirring to achieve a homogeneous, seed-free, clear molten glass having the following composition in weight %:

| | |
|---|---|
| $SiO_2$ | 46.2 |
| $B_2O_3$ | 14.0 |
| $Al_2O_3$ | 16.4 |
| CaO | 13.5 |
| MgO | 10.1 |

This molten glass is formed into a tubular glass pipe having an inside diameter of 2 inches, an outside diameter of 3 inches, and a nominal wall thickness of ½ inch by the "updraw process" as described in Chapter 8 of the "Glass Engineering Handbook," by E. B. Shand, McGraw-Hill Book Company, New York, N.Y. (1958). Several 10 foot sections of the glass pipe are formed by this updraw process. The resulting glass pipe is transparent, substantially seed-free and blister free, completely vitreous and has the following chemical and physical properties: 8n

| Log Viscosity | Temperature °C |
|---|---|
| 13.4 | 671 |
| 7.65 | 831 |
| 4.0 | 1030 |
| 2.5 | 1200 |
| Liquidus,T°C | 1000 |
| Log Viscosity at Liquidus Temperature | 4.6 |
| Dielectric Properties | |
| K | 6.2 |
| tan δ | 0.00074 |
| K tan δ | 0.0046 |
| Chemical Durability | |
| Weight loss mg/10g (at 121°C — 30 minutes by ASTM, test C-225-68, Method PW) | 6.5 |

A stranded copper conductor is pulled through a section of the glass pipe to form the structure as shown in FIG. 1. Three of such sections are prepared and assembled in an external duct as shown in FIG. 2 together with $SF_6$ as the heat transfer fluid in conduit 10 and cooling water circulating through free volume 21 as described in conjunction with FIGS. 1 and 2.

Three-phase AC power having a rating of 50 megawatts and a voltage of 200 KV (line to ground) is successfully transmitted through the above described conductor assembly.

Increased corona protection and enhanced resistance to electrically induced migration of the copper conductor into the glass pipe is attained in the assembly described above when the internal surface of the glass is provided with a thin semiconductive coating of tin oxide having a surface resistivity of about 500 ohms per square by pyrolysis of vaporous $SnCl_4$ on such internal surface.

In a typical underground installation for transmitting 200 KV (line to ground) alternating current as in the embodiment of FIG. 2, the following conditions are suitable:

conductors 11 are one million circular mil segmented copper conductors having a nominal outside diameter of 0.83 inch and an operating temperature of up to 160°C;

conduits 10 are formed from the glass composition of Example 1 with an inside diameter of 1.1 inch, an outside diameter of 2.7 inch and a wall thickness of 0.8 inch, and having a semiconductive tin oxide coating with a surface resistivity of 500 ohm per square on the internal surfaces thereof;

the heat transfer fluid occupying free volume 12 in conduits 10 is gaseous octafluorocylobutane at a pressure of 75 psig;

duct 20 is of welded mild steel pipe having an inside diameter of 8 inches and an outside diameter of 8.5 inches; and liquid water circulates through free volume 21 defined between conduits 10 and duct 20.

The entire assembly is buried in a trench, three feet deep by 3.5 feet wide and the trench is backfilled with soil.

EXAMPLES 2 – 11

To further illustrate the principles of the present invention, high purity batch materials are melted by the method of Example 1 to yield the glass compositions designated in Table I. These glasses are drawn into glass pipe as in Example 1 and the electrical and physical properties of the pipe are evaluated and reported in Table I.

Similar results are obtained when these glass pipes are used for electrical power transmission as in Example 1.

Table I

| Oxide | Composition (in weight %) and Properties for Electrical Conduits | | | | | | | | | |
|---|---|---|---|---|---|---|---|---|---|---|
| | Ex.2 | Ex.3 | Ex.4 | Ex.5 | Ex.6 | Ex.7 | Ex.8 | Ex.9 | Ex.10 | Ex.11 |
| $SiO_2$ | 44.0 | 53.0 | 37.9 | 28.6 | 35.8 | 30.9 | 37.8 | 42.6 | 50.8 | 41.2 |
| $B_2O_3$ | 12.3 | 13.8 | 11.3 | 16.2 | 20.2 | 18.4 | 22.6 | 6.2 | 9.4 | 24.4 |
| $Al_2O_3$ | 29.1 | 22.2 | 24.0 | 37.9 | 29.6 | 23.6 | 16.0 | 24.3 | 16.0 | 22.6 |
| CaO | 9.4 | 7.2 | 15.4 | 10.0 | 8.3 | 15.9 | 13.6 | 15.8 | 14.2 | 6.5 |
| MgO | 5.8 | 4.3 | 11.4 | 7.4 | 5.7 | 11.0 | 9.7 | 11.1 | 9.6 | 4.8 |
| Electrical Properties at 150°C | | | | | | | | | | |
| Dielectric Constant (K) | 5.86 | 5.20 | 6.95 | 6.85 | 6.00 | 7.35 | 6.55 | 7.50 | 6.73 | 5.48 |
| Dissipation Factor ($\tan\delta$) × $10^3$ | 1.5 | 9.7 | 1.0 | 0.98 | 0.74 | 1.50 | 1.70 | 0.80 | 0.57 | 20.0 |
| K $\tan\delta$ × $10^2$ | 0.88 | 5.0 | 0.69 | 0.67 | 0.44 | 1.10 | 1.10 | 0.60 | 0.38 | 10.9 |
| Glass Properties | | | | | | | | | | |
| Liquidus Temperature (°C) | 1400 | 1220 | 1200 | 1430 | 1585 | 1090 | 960 | 1290 | 1100 | 1200 |
| C of T.E. × $10^6$ | 3.9 | 3.4 | 5.4 | 4.5 | 4.1 | 5.6 | 5.2 | 5.3 | 5.0 | 3.8 |

The data in Example 1 and Table I clearly illustrate how the electrical and physical properties of the glass compositions of invention are functions of composition. For instance, it is readily seen that all 11 of the Examples fulfill the specific physical and electrical requirements which are:

| | |
|---|---|
| K | ≤ 8 |
| K $\tan\delta$ | ≤ 0.1 |
| Liquidus Temperature | ≤ 1430°C |
| Coefficient of Thermal Expansion × $10^6$ (0–300)/°C | ≥ 3 |

Example 11 illustrates the compositional significance of the K $\tan\delta$ factor when $B_2O_3$ is near the upper limit and the CaO + MgO is near the lower limit. This particular data is considered to be within the experimental deviation encompassed by the term K $\tan\delta$ ≤ 0.1.

It is also apparent that Examples 1, 3, 4, 7, 8, and 10 fulfill the more preferred requirements which are:

| | |
|---|---|
| K | ≤ 7.3 |
| K $\tan\delta$ | ≤ 0.05 |
| Liquidus Temperature | ≤ 1200°C |
| Coefficient of Thermal Expansion × $10^6$ (0–300)/°C | ≥ 3.5 |

Example 3 illustrates the compositional significance of the K $\tan\delta$ when $B_2O_3$ is near the upper limit and the CaO + MgO is near the lower limit.

Examples 4, 8, and 10 clearly exhibit the most preferred properties from the standpoint of commercial desirability. These properties are:

| | |
|---|---|
| K | ≤ 6.8 |
| K $\tan\delta$ | ≤ 0.02 |
| Liquidus Temperature | ≤ 1100°C |
| Coefficient of Thermal Expansion × $10^6$ (0–300)/°C | ≥ 3.7 |

Having thus described the invention, what is claimed is:

1. A tubular cylindrical glass conduit for containing and electrically insulating electrical power conductors, said conduit having a dielectric constant (K) of less than about 8 at 150°C and 50 Hz, a dielectric loss factor (K $\tan\delta$) of less than about 0.1 at 150°C and 50 Hz, and a coefficient of thermal expansion in the range of about 3 to about 7 × $10^{-6}$ /°C (0°–300°C), said glass conduit consisting essentially of an alkali metal oxide free composition within the weight % range:

| OXIDE | WEIGHT % |
|---|---|
| $SiO_2$ | 28–60 |
| $B_2O_3$ | 5–25 |
| $Al_2O_3$ | 13–35 |
| CaO | 0–30 |
| MgO | 0–30 |
| Wherein: | |
| CaO+MgO | 10–30 |
| $SiO_2$+$B_2O_3$ | ≤ 75 |
| $SiO_2$+$Al_2O_3$ | ≤ 75 |
| $Al_2O_3$+CaO+MgO | ≤ 60. |

2. The glass conduit of claim 1 having a dielectric loss factor (K $\tan\delta$) of less than about 0.05 at 150°C and 50 Hz, and a composition consisting of:

| OXIDE | WEIGHT % |
|---|---|
| $SiO_2$ | 30–60 |
| $B_2O_3$ | 5–24 |
| $Al_2O_3$ | 14–25 |
| CaO | 5–20 |
| MgO | 5–20 |
| Wherein: | |
| CaO+MgO | 11–28 |
| $SiO_2$+$B_2O_3$ | ≤ 70 |
| $SiO_2$+$Al_2O_3$ | ≤ 70 |
| $Al_2O_3$+CaO+MgO | ≤ 55. |

3. The glass conduit of claim 1 having a dielectric loss factor (K $\tan\delta$) of less than about 0.02 at 150°C and 50 Hz, and a composition consisting of: 8n

| OXIDE | WEIGHT % |
|---|---|
| $SiO_2$ | 35–60 |
| $B_2O_3$ | 5–23 |
| $Al_2O_3$ | 14–22 |
| CaO | 5–20 |
| MgO | 5–20 |
| Wherein: | |
| CaO+MgO | 15–25 |
| $SiO_2$+$B_2O_3$ | ≤ 65 |
| $SiO_2$+$Al_2O_3$ | ≤ 65 |
| $Al_2O_3$+CaO+MgO | ≤ 45. |

* * * * *